United States Patent [19]
Moore

[11] Patent Number: 5,398,021
[45] Date of Patent: Mar. 14, 1995

[54] RELIABLE INFORMATION SERVICE MESSAGE DELIVERY SYSTEM

[75] Inventor: Morris A. Moore, Wellington, Fla.
[73] Assignee: Motorola, Inc., Schaumburg, Ill.
[21] Appl. No.: 93,021
[22] Filed: Jul. 19, 1993
[51] Int. Cl.[6] .............................................. H04Q 7/00
[52] U.S. Cl. ......................... 340/825.27; 340/825.44; 340/825.22; 340/825.31
[58] Field of Search ....................... 340/825.26, 825.22, 340/825.44, 825.31, 825.47, 825.27, 311.1; 455/38.1

[56] References Cited

U.S. PATENT DOCUMENTS

| | | | |
|---|---|---|---|
| 4,639,726 | 1/1987 | Ichikawa et al. | 340/825.44 |
| 4,677,434 | 1/1987 | Fascenda | 380/23 |
| 4,845,491 | 7/1989 | Fascenda et al. | 340/825.44 |
| 4,849,750 | 7/1989 | Andros et al. | 340/825.44 |
| 4,870,403 | 9/1989 | Mori et al. | 340/825.44 |
| 4,894,649 | 1/1990 | Davis | 340/825.44 |
| 4,959,644 | 9/1990 | Sato | 340/825.44 |
| 5,025,252 | 6/1991 | DeLuca et al. | 340/825.44 |
| 5,045,848 | 9/1991 | Fascenda | 340/825.26 |
| 5,345,227 | 9/1994 | Fascenda et al. | 340/825.22 |

FOREIGN PATENT DOCUMENTS
WO88/09104 11/1988 WIPO .

Primary Examiner—Donald J. Yusko
Assistant Examiner—Edwin C. Holloway, III
Attorney, Agent, or Firm—James A. Lamb

[57] ABSTRACT

A method and apparatus for reliably delivering information service messages (300) from a central terminal (106) to a communication receiver (118) in a wireless message communication system (100). The communication receiver (118) receives information service messages including an information group identifier and data updates corresponding thereto. The communication receiver (118) receives disable messages (400) including an expiration time. The communication receiver (118) decodes received data updates (306) when the information group identifier (226) is determined as enabled. It does not decode received data updates (306) when the information group identifier (220) is determined as disabled (222). The communication receiver (118) determines enabled status as a default condition, and determines disabled status when a disable message (400) was received. The received disable message (400) includes an expiration time (408) for maintaining the information group identifier (220) disabled until the expiration time (224) expires and then enables the information group identifier (220).

9 Claims, 4 Drawing Sheets

RELIABLE INFORMATION SERVICE MESSAGE DELIVERY SYSTEM

FIELD OF THE INVENTION

This invention relates generally to information service communication systems, and more specifically to a method and apparatus for reliably delivering information messages to one or more subscribing remote units from a central communication system utilizing a paging transmitter system.

BACKGROUND OF THE INVENTION

Communication systems, such as paging systems, typically communicate messages over the air from an originating device to one or more destination devices. The destination device, e.g., a selective call receiver or pager, typically presents the information received to the user by displaying the information on a display.

A distinct trend in the market is customers desiring long information messages, while being afforded the mobility advantages of wireless communication such as by a paging system. Transmission of these messages over a paging channel can encounter a number of obstacles to reliable delivery of the messages, such as different types of interference, fading, noise, and other phenomena detracting from error-free and reliable communication of the messages to the destination devices.

In a subscription based communication system a subscribing receiver typically is enabled by receiving an enable message and disabled by receiving a disable message. This mechanism in the communication system regulates the subscriber's ability to receive only those information messages that are subscribed to, or that a subscription has been paid for. The financial viability of an information service communication system depends to a great degree on the ability to bill customers and regulate reception of information messages to paying customers.

The difficulty in reliable wireless transmission of information messages is especially frustrating to customers that are accustomed to receiving information messages over a more reliable communication medium, such as direct wire line, cable, or dial-up telephone communication. One such problem is the reliable communication of an enable or disable message to the communication receiver. If the enable/disable message is missed by the communication receiver, erroneous operation can follow.

For example, a communication receiver can receive unauthorized reception of information messages due to a missed disable message. Alternatively, a customer may be frustrated because the communication receiver does not receive subscribed to information messages due to a missed enable message. Over cable or wireline media, for example, the message communication comprises extremely low error rates and therefore the likelihood of missing one of these enable/disable messages is extremely low. However, information services that desire to offer the mobility advantages of wireless communication are confronted by the substantial likelihood that an enable/disable message will be missed. This in turn results in lower financial viability for the wireless information communication system due to frustrated subscribing customers going to alternative information providers because of missed enable messages resulting in missed subscribed to information messages, or alternatively, due to unauthorized reception of information messages by non-paying consumers due to missed disable messages. In either case, the conventional wireless communication system is at a competitive disadvantage.

Therefore, since information service communication systems are in an increasingly competitive marketplace where financial viability determines the longevity of an enterprise, and since the aforementioned trend in the marketplace is toward greater mobility for consumers of information services with the increased likelihood of missing messages, a need exists to enhance the reliability of receiving information messages by subscribing communication receivers in wireless communication systems while regulating the reception of information messages by non-paying consumers.

SUMMARY OF THE INVENTION

According to an embodiment of the present invention, there is provided a method and apparatus for reliably delivering information service messages to a communication receiver in a communication system. The communication receiver receives wireless transmissions comprising information service messages, the information service messages comprising an information group identifier and information data updates corresponding with the information group identifier. The communication receiver also receives wireless transmissions comprising disable code messages, the disable code messages comprising a destination address of a communication receiver, an information group identifier, and a disable code expiration time. The communication receiver decodes received information data updates corresponding with the information group identifier when the information group identifier is determined as having an enabled status. It does not decode the received information data updates corresponding with the information group identifier when the information group identifier is determined as having a disabled status. The communication receiver determines that an information group identifier has an enabled status as a default condition, and that the information group identifier has a disabled status when a disable code message was received. The received disable code message includes a destination address matching a predetermined address for the portable communication receiver, and an information group identifier to be disabled, and a disable code expiration time for maintaining the information group identifier disabled until the disable code expiration time expires at which time the communication receiver automatically enables the information group identifier.

DESCRIPTION OF A PREFERRED EMBODIMENT

Figure 1:
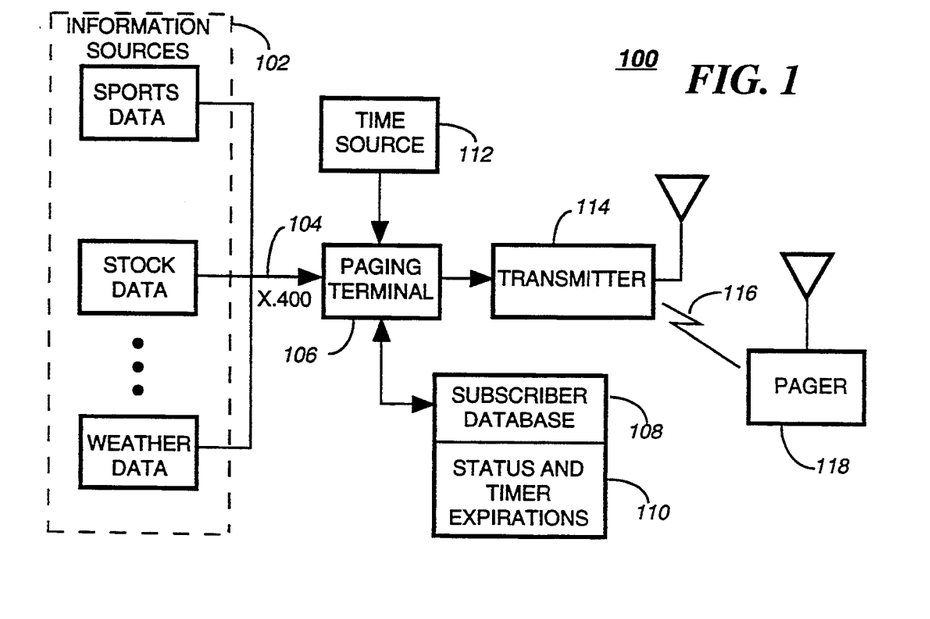
FIG. 1 is a block diagram of a communication system in accordance with the preferred embodiment of the present invention.

FIG. 1 shows a communication system 100 utilizing a paging terminal 106 and transmitter system 114, for delivering messages 116 to at least one portable remote unit, e.g., a portable selective call receiver 118, in accordance with the preferred embodiment of the present invention. The central terminal 106 comprises input sections for receiving inputs from a number of different devices for initiating pages that are transmitted by the paging transmitter system 114 to the at least one portable remote unit 118.

The central terminal 106 has input sections (not shown) that interface with telephone company equipment, such as the public switched telephone network (PSTN). Personal computers or other computing devices 104 can access the input sections (not shown) through the PSTN using a dial-up telephone line and modem communication. Other calling devices, such as telephone input devices can access the input sections (not shown of the central terminal 106 through the PSTN.

Alternatively, other input sections (not shown) of the central terminal 106 can receive inputs, such as page requests, from local computing devices 108, such as a local personal computer or console or other terminal device. Typically, the one or more local input devices interface with the input sections (not shown) of the central terminal 106 via direct wire line connections using standard RS-232 or RS-422 interface protocols.

Also, in the preferred embodiment of the present invention, an interface to an X.400 network 104, e.g., an X.400 gateway, can handle message delivery between the input sections (not shown) of the central terminal 106 and one or more originating devices 102 on the X.400 network 104. These originating sources 102 can deliver information update messages from one or more information service providers. For example, stock market data, sports data, weather data, and other information updates may be offered from different originating terminal devices on the X.400 network 104 to couple information messages therethrough to the paging terminal 106. A communication system providing an interface to an X.400 electronic mail system is more fully discussed in a prior copending patent application, application No. 07/954,179, entitled "ELECTRONIC MAIL MESSAGE DELIVERY SYSTEM", which is assigned to the same assignee as the present invention and is incorporated herein by reference.

The paging terminal 106 includes a paging encoder (not shown) for encoding messages for transmission over a paging channel. The paging encoder couples the encoded messages over a communication path to one or more paging transmitter systems 114 for transmission over a paging communication channel. The general operation of a communication system including a paging system of the type shown in FIG. 1 is more fully described in U.S. Pat. No. 5,138,311, issued Aug. 11, 1992, entitled, "Communication System Having Adaptable Message Information Formats", which is assigned to the same assignee as the present invention and is incorporated herein by reference.

Further, the paging terminal 106 is coupled to a subscriber database 108 stored in a memory device. The subscriber database 108 includes subscriber records identifying each subscribing communication receiver 118 and the particular information services subscribed to by the communication receiver 118. Additionally, with the information provided by a clock or time source 112 coupled to the paging terminal 106, the paging terminal 106 also maintains status and disable code expiration time information 110 associated with each subscriber record in the subscriber database 108. The status information identifies whether the subscriber is enabled or disabled to receive a particular type of information update. Further, the status information also identifies whether the communication receiver 118 is authorized to receive the particular information updates. Authorization status can depend on whether the user of the communication receiver has paid a subscription fee or otherwise has met certain authorization requirements of the information service provider. The status information can be updated periodically, such as by system operators, in response to changes in subscriber status in subscriber billing cycles other authorization event cycles. These cycles, or time intervals, identify when the information service providing system communicates with its subscribers are allows them to change their subscriptions, memberships to different services, or other authorization events. The disable code message expiration time information 110 stored along with status information 110 associated with each subscriber record in the subscriber database 108 is a predefined time interval for a communication receiver 118 that disables reception of a particular type of information, e.g., sports data updates, until an expiration of the time interval. After the time interval expires, the communication receiver 118 will automatically reenable reception of the type of information, e.g., sports data updates, unless the paging system 106 has previously sent another disable code message with another expiration time update. Hence, to inhibit a communication receiver 118 from receiving information updates, such sports data updates, the communication system 100 will send disable code messages periodically to the communication receiver 118 to keep it disabled, i.e., to prevent its reception of the sports data updates. If the time elapses with no disable code message received during that time interval then the communication receiver 118 reenables itself to receive the sports data updates.

In this way, the communication system 100 provides reliable subscription operation by always defaulting the communication receiver to receive the information data updates, and only to disable reception when the disable code message is received and for a time interval thereafter as defined in expiration time information included with the disable code message. So, if the disable code message is not received, possibly due to reliability problems in the wireless communication medium, the communication receiver 118 will continue to subscribe to and receive information service updates that continue to be enabled. On the other hand, if the communication receiver receives a disable code message indicating that reception of a type of information update is disabled for a predetermined time interval, then the communication receiver 118 will only inhibit reception for the specified time interval. When the time interval expires the communication receiver 118 automatically returns to the default condition of receiving information updates. Therefore, this communication system 100 favors the rights of the subscribers to receive information updates over the possibility that unauthorized users will also receive information updates. However, the unauthorized reception is kept in check by periodic disable code messages that are randomly transmitted to disable reception of information updates. This operation of the system and other mechanisms to restrict unauthorized use while allowing subscribing users to receive information updates is more fully discussed below.

Figure 2:
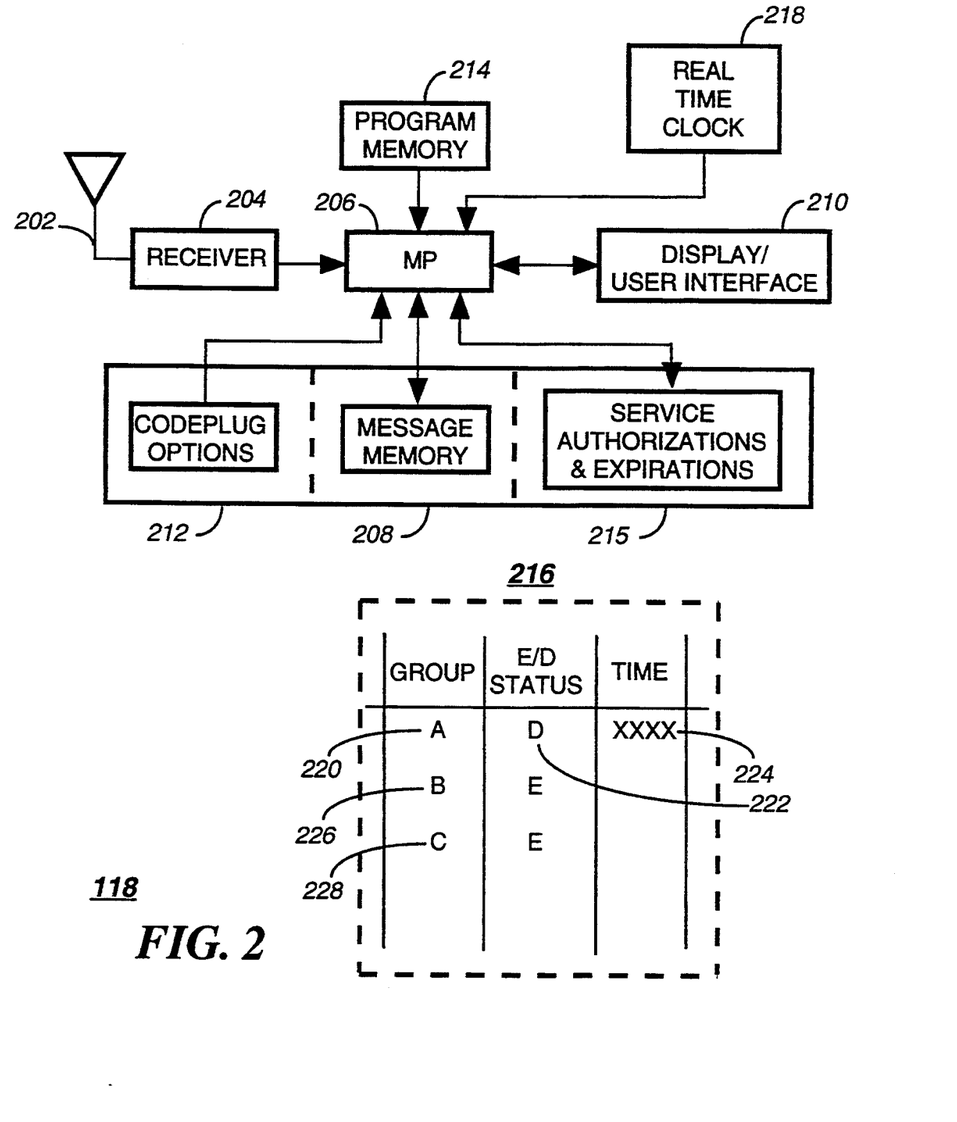
FIG. 2 is a block diagram of a communication receiver in accordance with the preferred embodiment of the present invention.

FIG. 2 is a block diagram of a communication receiver, e.g., a selective call receiver 118, in accordance with the preferred embodiment of the present invention. The selective call receiver 118 preferably comprises a paging receiver 204 that operates with an antenna 202 to receive messages transmitted over the paging communication channel and to present received message information, such as by a display 210, to a user of the paging receiver 118. The operation of a paging receiver 118 of the general type shown in FIG. 1 is well known and is more fully described in U.S. Pat. No. 4,518,961 issued May 21, 1985, entitled, "Universal Paging Device With Power Conservation", which is assigned to the same assignee as the present invention and is incorporated herein by reference.

The paging receiver 204 couples a received message to a controller 206 through a bus. The controller 206 operates to decode the received message, for matching address information in the received message to a predetermined address stored in a non-volatile memory 212, e.g., a code plug memory for storing operational parameters and addressing information in the selective call receiver 118. In this way, the controller 206 can determine whether the received message is intended for the particular selective call receiver 118. Further, a message memory 208 is coupled to the paging receiver 204 and the controller 206 for storing the received message information in the message memory 208. A user can access a user input means 210, such as buttons or switches, as part of a user interface at the remote unit 118 to cause the message data of a received message to be displayed on a display 210, e.g., a liquid crystal display. The user can then read the message that is visible on the display. User input at the remote unit 118 can also cause the remote unit 118 to perform other functions, such as may be well known to users of selective call receivers and portable personal computing devices.

A real time clock 218 is also coupled to the controller 206 for providing time information thereto. The remote unit 118 is then capable of providing time information to the user as part of displaying information on the display (not shown). Additionally, the controller 206 can utilize the time information provided by the real time clock 218 to keep track of the time when messages were received at the remote unit 118, when a disable code time interval has expired, and other useful time based operations that will be more fully discussed below.

The selective call receiver 118 includes a service authorizations and expirations memory 215 that is preferably a non-volatile memory. The information stored in the memory 215 is preferably organized as a table 216 as shown. The table includes three types of information for each information service subscription organized by rows. First, an information group identifier identifies the type of information updates received. A shown in this example, there are three types of information service updates, i.e., group A 220, group B 226, and group C 228. These groups may correspond to three information sources for an information service provider. For example, they may correspond to sports data updates, stock market data updates, and weather data updates, respectively. Second, an enable/disable status is associated with each group. This status information indicates whether reception of updates from a particular information group is enabled or disabled for the selective call receiver 118. For example, group A 220 has reception disabled 222, while groups B 226 and C 228 have reception enabled. Third, time information is stored in the table 216 indicating an expiration time for a disable time period. This time period corresponds to the time information received along with a disable code message requesting that reception of information updates for an information group be disabled for a predetermined time interval. For example, an expiration time 224 is stored in the table 216. The expiration time 224 is associated with the disabled reception of information updates for group A 220. When the real time clock 218 indicates that the expiration time has been reached the communication receiver 118 will automatically reenable reception of group A information updates by changing the enable/disable status entry for group A to enable status. In this way, the communication receiver 118 keeps track of a disable time interval and its expiration time for an information group. The communication receiver 118 does not have to receive an enable code message over the air to reenable reception of information updates. In this way, the communication receiver 118 always defaults to receiving information updates and assures a subscriber that the subscribed to information updates will be received. Optionally, a communication system 100 may utilize an enable code message to immediately reenable a communication receiver's reception of information updates. But, the system 100 is self-restoring by allowing a communication receiver 118 to automatically reenable reception of information updates even if no enable code message was received. The operation of the system to provide reliable delivery of subscribed to information updates to subscribers as a default system operation while checking and preventing the unauthorized reception of information updates by non-subscribing consumers will be more fully discussed below.

Figure 3:
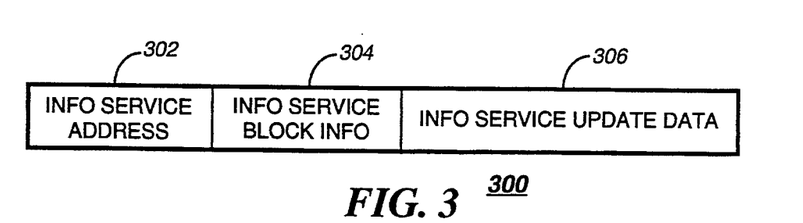
FIG. 3 is a message block diagram illustrating a transmitted information service message according to the preferred embodiment of the present invention.

FIG. 3 is a message block diagram illustrating a transmitted information service message 300 according to the preferred embodiment of the present invention. The information service message 300 comprises an information service address 302, an information service block information 304, and information service data 306.

The information service address 302 uniquely identifies the information service provider to all the subscribing receivers of the multi-recipient message 300. This address information allows communication receivers to identify transmitted messages and receive information service messages that the communication receivers are subscribing to.

The information service block information 304 provides additional system information to the receiver such that the receiver can identify, for example, whether a subscribed to information may be found within the information service data 306 for that receiver. Other system information, such as timing information, traffic data information, and message protocol information may also be provided in the information service block information 304.

The information service data 306 comprises the data portion of one or more messages from different information sources within the information service providers services. For example, sports data, stock data, and weather data may be included in the information service data 306 organized by the individual source of the particular information service.

A receiver of the information message 300 can determine from the information service block information 304 whether any particular sources subscribed to are transmitting updates in the information data portion 306 of the information service message 300. The communication receiver 118 accordingly can receive the particular updates from the information service data 306 according to the subscribed to services identified in the information service block information 304. In this way, a communication receiver 118 can receive information service messages 300 which it uniquely identifies to a particular information service provider, as determined by the information service address 302. The communication receiver 118 then can decode the particular information data updates 306 from information services that are transmitting information in the information service message 300 as indicated by the service block information 304.

Figure 4:
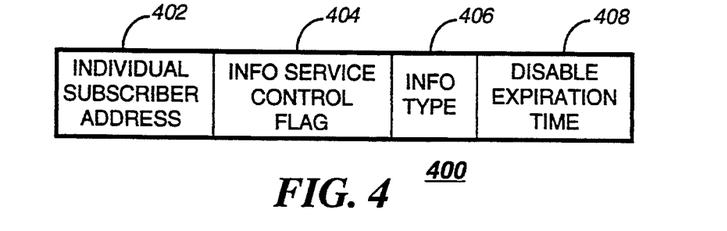
FIG. 4 is a message block diagram illustrating a transmitted disable code message according to the preferred embodiment of the present invention.

FIG. 4 is a message block diagram illustrating a transmitted disabled code message 400 according to the preferred embodiment of the present invention. The disabled code message 400 comprises an individual subscriber address 402, an information service control flag 404, an information type field 406, and a disabled expiration time field 408. The individual subscriber address 402 uniquely identifies the communication receiver as the destination of the disabled code message 400.

The information service control flag 404 identifies the source of the disabled code message. That is, it identifies the particular information service provider which has sent the disabled code message 400 to the communication receiver.

The information type field 406 identifies which subscription of information is being modified by the particular disable code message 400. For example, a communication receiver may subscribe to sports data, stock data, or weather data as individual subscriptions provided from one information service provider. Each one of these sources of information can be identified by an information type 406 sent with the disabled code message 400. Hence, for example, if the disabled code message 400 is directed toward weather updates, then the information type field 406 in the disabled code message 400 would uniquely identify the weather updates source of information as part of the disabled code message 400.

The disable expiration time 408 provides time information as part of the disabled code message 400 for the communication receiver. This time information can identify a specific time in the future when the disable code will expire. That is, when the communication receiver determines from its real time clock 218 that a time period has expired, as identified by the disable expiration time field 408 of a disable code message 400, the communication receiver will reenable the reception of the particular information type 406 subscribed to from the particular information service provider, as identified in the information service control flag 404.

In summary, the disable code message 400 is uniquely directed to a communication receiver which can identify from the message 400 the information service provider 404, the particular information source 406 subscribed to by the communication receiver, and an expiration time 408 for the disable code message 400. The expiration time indicates the time period that the disable code will be effective and at the expiration of which the communication receiver will reenable the reception of the particular subscription.

Figure 5:
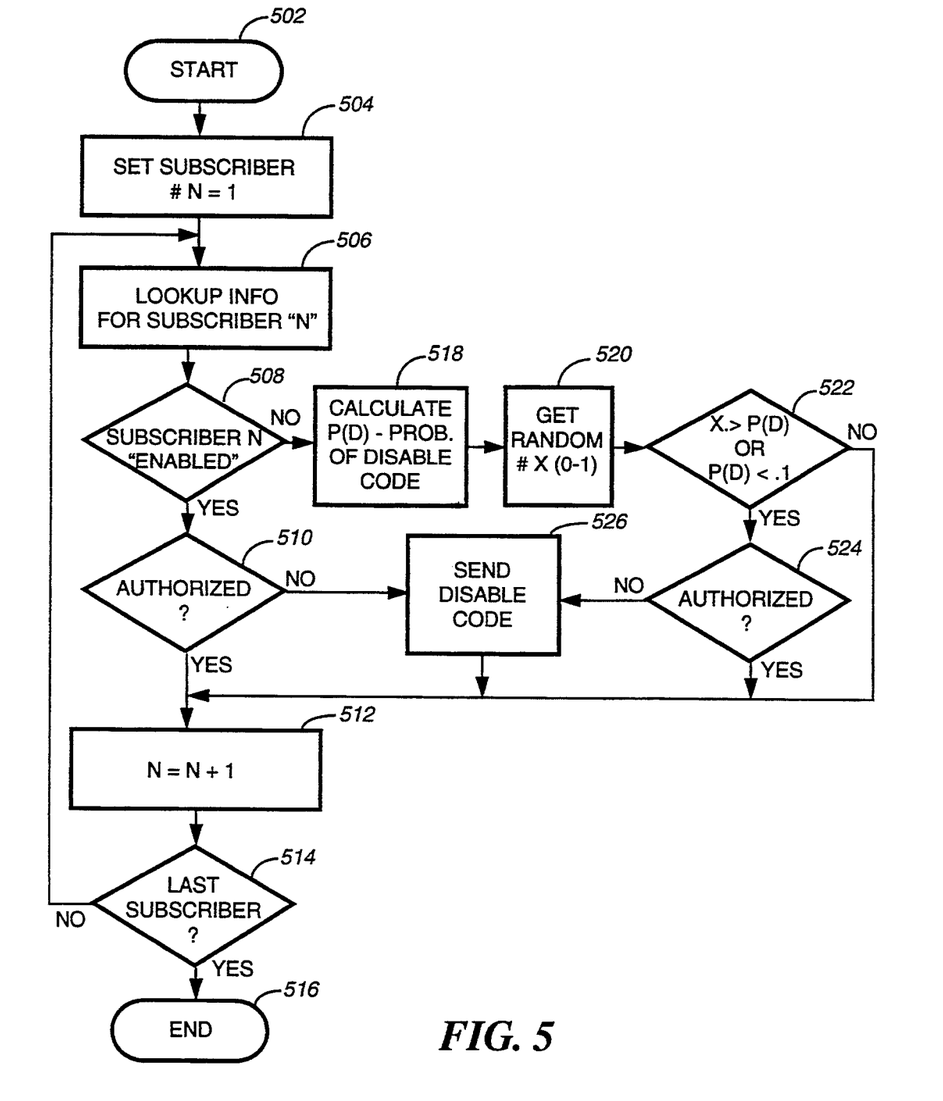
FIG. 5 is a flow diagram illustrating an operational sequence for the communication system of FIG. 1, according to the preferred embodiment of the present invention.

FIG. 5 is a flow diagram illustrating an operational sequence for the paging terminal 106 (FIG. 1) according to the preferred embodiment of the present invention. The paging terminal 106 performs this operational sequence for each information type, i.e., for each source of information for subscription available from an information service provider. For example, sports data, stock data, and weather data are individual information types that may be available from an information service. The paging system 106 would periodically perform this operational sequence for each information type scanning all of its subscriber records in the subscriber data base 108 as will be discussed below.

The paging terminal 106 begins at the first subscriber record, at steps 502, 504, and performs a look-up of the information stored at the subscriber record in the subscriber data base 108 for subscriber number one, at step 506. If the subscribers reception is enabled, at step 508, then the subscriber record identifies the subscriber as receiving the particular information service. Then, the paging system 106 verifies from the subscriber record whether the subscriber is authorized to receive that subscription at step 510. If the subscriber is authorized to receive the subscription the paging system 106 continues on to the next subscriber record, at steps 512, 514, 506. This loop is repeated for all the subscriber records in the subscriber data base 108, and then the paging system 106 can exit, at step 516, from the subscriber operation scan for the particular information type.

If a subscriber is not enabled, at step 508, the paging system 106 prepares a disabled code message to send to the particular communication receiver that is not enabled. Specifically, at step 518, the paging system 106 determines whether a disable code message will be sent at this time. That is, the transmission of a disabled code message is a relatively random event which is calculated within a time interval previously designated as part of a disable code message previously sent. The paging system 106 calculates the probability of sending the disable code at this time in the three steps shown, 518, 520, 522. The probability of disable code is defined as P(D) which equals the current time minus the time when the disable code expires divided by the total disable time interval. This fraction can range from zero to one. Then, at step 520, the paging system 106 generates a random number between zero and one. Subsequently, the paging system 106 compares the probability of disable code against the random number on one side of a probability range and against a very small number, such as 0.1, at the other side of a probability range. If the probability of disable code exceeds the end points of this probability range, as determined in step 522, the paging system 106 will then verify if the receiver is authorized to receive the subscription, at step 524.

If not authorized, then the paging system 106 will send the disable code at step 526. Otherwise, if the probability of disable code has not exceeded the end points of the probability range, at step 522, or if the communication receiver is authorized to receive the subscription information, at seep 524, the paging system 106 will not send a disable code at this time and will go on to process the next subscriber record from the subscriber data base 108, at steps 512, 514, 506.

Lastly, if a subscriber record is enabled, at step 508, but not authorized to received the information subscription, at step 510, the paging system 106 will also send the disable code to disable reception of the information by the non-authorized communication receiver.

In this way, the paging system 106 regulates the subscribers which can receive particular information subscriptions from a service provider. If any communication receiver is enabled to receive an information subscription, at step 508, but not authorized to receive it at step 510, such as due to not paying the required subscription fee, the paging system 106 will send a disable code to the communication receiver, at step 526, to disable reception of the particular subscription by the non authorized communication receiver. Of course, the subscriber record for that non-authorized communication receiver will be updated to disable future reception of information updates for that subscription. At subsequent time intervals, the paging System 106 will randomly send one or more disable code messages to the particular non authorized communication receiver to make sure that non authorized reception of the subscription will be inhibited at the communication receiver. However, if after an expiration time period for a disable code message the communication receiver does not receive any further disable code messages to maintain reception inhibited, then the communication receiver will reenable itself to receive that particular subscription. This would be typically the case when the subscriber has paid for the subscription and is therefore entitled to receive the information updates accordingly.

Figure 6:
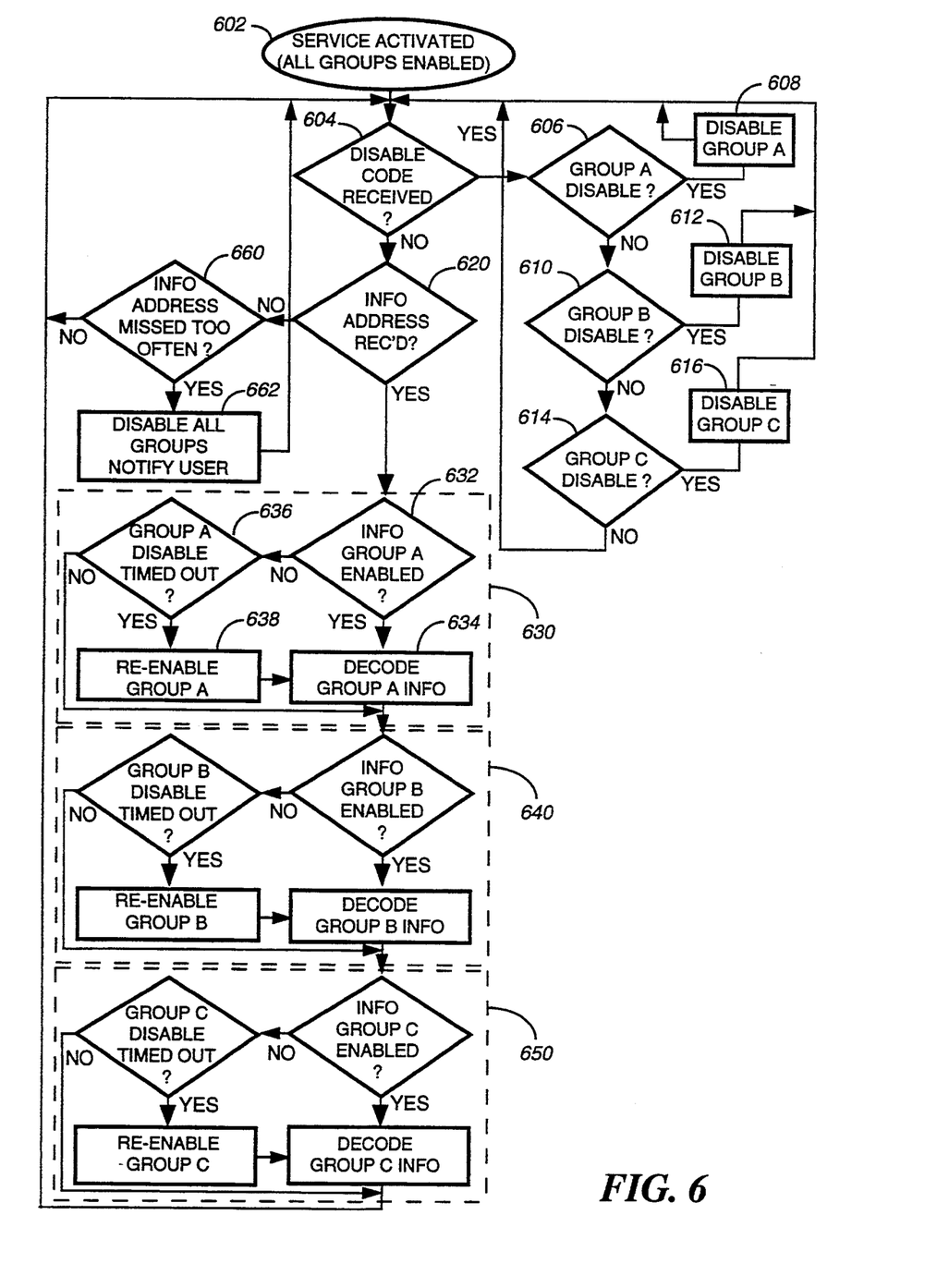
FIG. 6 is a flow diagram illustrating an operational sequence for the communication receiver of FIG. 2, according to the preferred embodiment of the present invention.

FIG. 6 is a flow diagram illustrating an operational sequence for the communication receiver 118 (FIG. 2) according to the preferred embodiment of the present invention. The communication receiver 118 may subscribe to three groups of information services provided by an information service provider. These three groups are labeled A, B, and C. For example, group A may comprise sports updates, group B may comprise stock market data, and group C comprises weather update information. The authorizations for reception of these three groups of information are indicated by a configuration table 216, as shown in FIG. 2. It is clear from the table 216 that the sports information updates 220 are disabled 222 for a disabled time interval due to expire at a time specified in the table 224. Alternatively, the stock market information 226 and the weather update information 228 are both enabled and can be freely received by the communication receiver 118. Periodically, the communication receiver 118 verifies if a disable code message has been received, at steps 602, 604. If a disable code message has been received then the communication receiver 118 verifies which group it affects. If the disable code message is intended for group A, at step 606, then the communication receiver 118 will update in the table the group A information to disable reception, at step 608. Similarly, if a disable code message is intended to disable group B information, at step 610 then the communication receiver 118 will update the group B information in the table to disable reception at step 612. If group C is to be disabled by the disable code message, at step 614 then the communication receiver 118 updates the respective group C information in the table to disable reception, at step 616.

If a disable code message was not received at step 604, the communication receiver 118 verifies if an information service message was received at step 620. If it was received, at step 620, then the communication receiver 118 identifies from the information service block information 304 of the information service message 300 whether information updates are directed to group A 630, group B 640 or group C 650.

For example, if group A information updates are received in the information service message 300 then the communication receiver 118 verifies from the table 216 whether group A reception is enabled at step 632. If it is enabled then the communication receiver 118 will decode the group A update data from the information service data portion 306 of the information service message 300. The communication receiver 118 may then store the decoded group A information updates accordingly.

Alternatively, if the information group A is not enabled at step 632, then the communication receiver 118 verifies whether the disable time has expired, at step 636. If it has expired, at step 636, then the communication receiver 118 will reenable group A reception, at step 638, by updating the information in the table 216 for group A 220. The disable status 222 will be changed to enable which then allows reception of group A information updates. Subsequently, the communication receiver 118 decodes group A information, at step 634. However, if the group A disable time has not expired at step 636, then the communication receiver 118 will not decode the group A information update and the user of the communication receiver 118 will not have access to that information. In similar fashion, the communication receiver 118 verifies whether group B information can be received, at step 640, and if group C information can be received, at step 650.

Finally, for each information service message received, at step 620, the communication receiver 118 determines whether the information address is being missed too often, at step 660, which indicates that there is reception problems or possibly that a user is attempting to circumvent the disable code mechanism which will prevent unauthorized reception of information message updates. If the communication receiver 118 determines that it has failed to receive information service messages above a predetermined threshold over a time interval then the communication receiver 118 can disable reception at step 662. Further, the communication receiver 118 can provide information on a display to inform a user that there is problem with reception and the user should call the service provider, optionally at a telephone number also provided with the display. In this way, the communication receiver 118 can determine if a user of the communication receiver 118 is likely to be unsatisfied due to poor reception or else may be attempting to receive unauthorized subscription information by turning the communication receiver 118 off for an unusually long amount of time attempting to prevent reception of a disable code message. In either case, the communication receiver 118 informs the user that a call to the central service provider to rectify the problem is requested.

A communication receiver can determine whether to disable reception under suspicious circumstances indicating either poor reception or an attempt to circumvent reception of a disable code message in a number of ways. In a first example, the communication receiver 118 can maintain a count of the number of times that an information service message has been received from an information service provider. If the communication receiver 118 is turned off it will not receive information service messages during that off time interval. Once the communication receiver 118 is turned back on it will receive information service messages. If an information service message includes information of the number of information service messages transmitted over the previous time interval then when the communication receiver 118 receives an information service message it can determine whether it has been turned off, i.e., missed previously transmitted information messages, for greater than a predetermined threshold amount, such as greater than 10% of previously transmitted messages over a predetermined time interval. In this way, the communication receiver 118 determines whether suspicious circumstances require disabling reception and instructing the user to call the service provider.

In a second example, the communication receiver 118 measures the overall amount of time that the communication receiver is turned off versus the total amount of time specified for a disable time interval, or a fraction thereof. Therefore, if the total amount of time is, for example, one week and the communication receiver has been turned off for several days during that week, then the communication receiver can disable reception of information updates due to the suspicious reception pattern over that one week time interval. The user would have to call the service provider to reenable reception or to correct the problem.

In a third example, the communication receiver 118 can maintain an average expected number of receptions of information service messages, such as determined over a previous time interval. Then, the communication receiver can maintain a count of the current reception of information service messages over the current time interval and if the current count is below the average expected reception of information service messages, or a fraction thereof, then the communication receiver 118 can disable reception and require the user to contact a service provider.

Once a user contacts the service provider their communication receiver 118 can be reenabled by transmission of an over-the-air (OTA) enable code message transmitted to the communication receiver. Alternatively, the subscriber can bring the communication receiver 118 to a service shop which can reprogram a configuration memory to reenable reception of information updates by the communication receiver 118.

Thus, as discussed above, a communication system 100 has been shown that regulates reception of information message updates to subscribing communication receivers 118 so that even with a higher probability of missing messages due to the over-the-air transmissions the communication receivers 118 will normally receive information updates that they have subscribed to. Further, unauthorized reception of information updates is checked and deterred by randomly transmitted disable code messages.

What is claimed is:

1. A method in a communication receiver, the method comprising the steps of:
   (a) receiving wireless transmissions comprising information service messages, the information service messages comprising an information group identifier and information data updates corresponding with the information group identifier;
   (b) receiving wireless transmissions comprising disable code messages, the disable code messages comprising a destination address of a communication receiver, an information group identifier, and a disable code expiration time;
   (c) decoding received information data updates corresponding with the information group identifier when the information group identifier is determined as having an enabled status, and
   not decoding the received information data updates corresponding with the information group identifier when the information group identifier is determined as having a disabled status; and
   (d) determining that an information group identifier has an enabled status as a default condition, and that the information group identifier has a disabled status when a disable code message was received, where the received disable code message included:
   a destination address matching a predetermined address for the communication receiver, and
   an information group identifier to be disabled, and
   a disable code expiration time for maintaining the information group identifier disabled until the disable code expiration time expires at which time the communication receiver automatically enables the information group identifier.

2. The method of claim 1, further comprising the steps of:
   maintaining a reception count corresponding to reception of information service messages; and
   disabling reception of information service messages when the reception count exceeds a predetermined threshold amount.

3. The method of claim 2, wherein the information service messages include message transmission information representative of a number of information service messages transmitted over a time interval, and wherein the predetermined threshold amount is the message transmission information.

4. The method of claim 2, wherein the predetermined threshold amount is a value computed by the communication receiver as a function of a received disable code expiration time, and wherein the reception count is maintained by the communication receiver as a function of an off time for the communication receiver.

5. The method of claim 2, wherein the predetermined threshold amount is a value computed by the communication receiver as a function of receptions of the information service messages.

6. A selective call receiver comprising:
   a paging receiver for receiving messages including information service messages and disable code messages, the information service messages comprising an information group identifier and information data updates corresponding with the information group identifier, and the disable code messages comprising a destination address of a communication receiver, an information group identifier, and a disable code expiration time information;
   an address memory for storing predetermined address information;
   a status memory for storing status information comprising enable/disable status information and disable code expiration time information associated with at least one predetermined information group identifier; and
   a controller electrically coupled to the paging receiver, the address memory, and the status memory for
   decoding the received information data updates corresponding with the information group identifier when the information group identifier is determined as having an enabled status, and not decoding the received information data updates corresponding with the information group identifier when the information group identifier is determined as having a disabled status, where the controller determines that an information group identifier has an enabled status as a default condition, and that the information group identifier has a disabled status when a disable code message was received, where the received disable code message included:
- a destination address matching a predetermined address information for the selective call receiver, and
- an information group identifier to be disabled, and
- a disable code expiration time for maintaining the information group identifier disabled until the disable code expiration time expires at which time the communication receiver automatically enables the information group identifier.

7. The selective call receiver of claim 6, wherein the controller maintains a reception count corresponding to reception of information service messages, and the selective call receiver disables reception of information service messages when the reception count exceeds a predetermined threshold amount.

8. A communication system comprising:

paging transmitting means for wireless transmitting messages including information service messages and disable code messages, the information service messages comprising an information group identifier and information data updates corresponding with the information group identifier, and the disable code messages comprising a destination address of a communication receiver, an information group identifier, and a disable code expiration time information; and at least one selective call receiver, each one of the at least one selective call receiver comprising:
- a paging receiver for receiving the messages including the information service messages and the disable code messages;
- an address memory for storing predetermined address information;
- a status memory for storing status information comprising enable/disable status information and disable code expiration time information associated with at least one predetermined information group identifier; and
- a controller electrically coupled to the paging receiver, the address memory, and the status memory for
  - decoding the received information data updates corresponding with the information group identifier when the information group identifier is determined as having an enabled status, and
  - not decoding the received information data updates corresponding with the information group identifier when the information group identifier is determined as having a disabled status, where the controller determines that an information group identifier has an enabled status as a default condition, and that the information group identifier has a disabled status when a disable code message was received, where the received disable code message included:
    - a destination address matching a predetermined address information for the selective call receiver, and
    - an information group identifier to be disabled, and
    - a disable code expiration time for maintaining the information group identifier disabled until the disable code expiration time expires at which time the communication receiver automatically enables the information group identifier.

9. The communication system of claim 8, wherein the information service messages include message transmission information representative of a number of information service messages transmitted over a time interval, and wherein the controller maintains a reception count corresponding to reception of information service messages, and wherein each of the at least one selective call receiver disables reception of information service messages when the reception count exceeds a threshold set by a received message transmission information.

* * * * *